Patented Apr. 11, 1939

2,153,999

UNITED STATES PATENT OFFICE 2,153,999

ELECTROLYTIC CONDENSER

Herbert Waterman, Manhasset, N. Y., assignor to Aerovox Corporation, Brooklyn, N. Y., a corporation of New York No Drawing. Application December 9, 1937, Serial No. 178,877

9 Claims. (Cl. 175—315)

My present invention is concerned with electric condensers and more especially with electrolytic condensers known as dry electrolytic condensers, in which substantially all of the electrolyte is incorporated in an insulating interspacer intervening between the electrode foils.

Among the objects of the invention are to provide an electrolyte for condensers of the above type, the characteristics of which are such as to reduce greatly the necessary time of formation to any given voltage, and which also has improved power factor and leakage characteristics for any given voltage.

Another object is to provide an electrolyte of the above type, which is liquid at a temperature but slightly above the range of temperature to which the completed condenser may be subjected in use and thereby facilitates impregnation of the interspacer by immersion of the pre-wound condenser roll into the electrolyte or by immersion of the interspacer in the course of winding and which even at the maximum temperature of actual use of the finished condenser structure, is highly viscous or solid, so as to remain in situ in such structure.

Another object is to provide an electrolyte of the above type, the cost of which does not differ markedly from that of electrolytes in common use, and which may be prepared with the same facility and substantially the same equipment and methods of control resorted to in practice at the present time.

The invention depends in its essence on the discovery that by the mere addition of hexahydric alcohol, preferably of manitol, to an electrolyte mix of type known to be generally suitable for dry electrolytic condensers, namely of polyhydric alcohol such as glycol; a weak acid such as boric acid; and an alkali such as ammonia, it is not necessary, in order to attain any given voltage characteristic to cook the mix to as high a temperature as in the absence of such hexahydric alcohol. Consequently the product has a better power factor by reason of the lesser degree of water evaporation, and furthermore has the physical characteristic of permitting ready impregnation in the slightly heated electrolyte. Yet the electrolyte promptly becomes solid or nearly solid and stays in such condition under all conditions of actual use of the condenser incorporating the same.

While the invention has a wide range of applicability for the improvement of electrolytes, the underlying ingredients of which are those above enumerated, it is understood that the polyhydric alcohol preferably ethylene glycol, may be glycerin, di-ethylene glycol or the like, the weak acid ingredient, preferably boric acid may be replaced in whole or in part by corresponding weak acids, such as malic, citric, lactic, acetic and phosphoric acid, and the alkali, preferably ammonia may be replaced in whole or in part by other alkali metal radicals such as those of sodium or potassium.

By way of exemplification of the invention, it is noted that under conditions of laboratory control, an electrolyte of the prior art consisting illustratively of 28 parts by weight of boric acid, 15 parts of ethylene and 3¼ parts of ammonia, must be boiled to a temperature of approximately 265 degrees F. to be suitable in actual commercial practice for condensers rated at 500 volts working voltage and the formation of the condenser with such electrolyte incorporated therein takes about three hours or more when preformed foil is used.

Under the same conditions of laboratory control when the same electrolyte mix has added thereto five parts by weight of manitol, however, it is necessary to cook it only to a boiling point of 257 degrees F. to attain the voltage characteristic above set forth, and condenser structures impregnated with such electrolyte will form in 45 minutes or less to 500 volts working voltage. The power factor and leakage of the electrolyte with the added manitol are about 100 per cent better than those of the electrolyte devoid of manitol.

In actual mass production of condensers with the use of preformed foil, bearing in mind the variability of the units in practice, it usually requires between 12 and 18 hours to suitably form a given lot of condensers made with the prior art electrolyte, while formation for less than 5 hours and at a boiling point of from 8 to 20 degrees lower than that required with prior electrolytes is adequate under like conditions for the electrolyte with the manitol ingredient.

With the use of the illustrative electrolyte consisting as set forth of 28 parts by weight of boric acid, 15 parts of ethylene glycol, 5 parts of manitol and 3¼ parts of ammonia, the mix being cooked to a boiling point of 257 degrees F. there are attained in addition to the electrical properties set forth, advantageous physical characteristics. At around 200 degrees F. the electrolyte prepared as set forth becomes sufficiently liquid to admit of impregnating the prewound condenser rolls by immersion or alternatively by drawing the interspacer therethrough and impregnating it in the course of winding the condenser rolls. Yet, at temperature but little below 160 degrees F., and well above the maximum temperature that such condensers reach under the most severe conditions of use, the electrolyte has solidity to such degree that mechanical leakage thereof is substantially obviated.

While the illustrative desirable formula set forth includes approximately 10 per cent by weight of manitol, it is understood that this percentage is not critical, but it may be decreased or increased as desired, it being noted that in general, the performance of the condenser improves in a direct ratio with the proportion of manitol present, provided that proportion be not much above 15 per cent.

For brevity of definition in certain of the claims the hexahydric alcohol is defined as one of "different order" from the other polyhydric alcohols used therewith in the electrolyte of this invention which have a lower number of hydroxyl ions therein.

As many changes could be made in the above electrolyte and many apparently widely different embodiments of this invention could be made without departing from the scope of the claims, it is intended that all matter contained in the above description shall be interpreted as illustrative and not in a limiting sense.

Having thus described my invention, what I claim as new and desire to secure by Letters Patent is:

1. An electrolyte mix for dry electrolytic condensers including the following raw ingredients: a weak acid of the group consisting of boric, malic, citric, lactic, acetic and phosphoric acid, an alkali material of the group consisting of a salt of ammonium, sodium and potassium and two or more polyhydric alcohols including a hexahydric alcohol and a polyhydric alcohol of lower order.

2. An electrolyte mix for dry electrolytic condensers comprising boric acid, ammonia, and two or more polyhydric alcohols of different order and including manitol and a polyhydric alcohol of lower order.

3. An electrolyte for dry electrolytic condensers comprising the product of cooking a mixture consisting of boric acid, ammonia, a polyhydric alcohol of the group consisting of the di-hydric and tri-hydric alcohols and a lesser proportion of a hexahydric alcohol.

4. An electrolyte for dry electrolytic condensers consisting of boric acid, ethylene glycol, ammonia and manitol.

5. An electrolyte for dry electrolytic condensers, formed from a mixture of approximately one-half by weight of boric acid approximately six per cent or more by weight of ammonia and the balance of ethylene glycol and manitol, said electrolyte being the product resulting from cooking the mixture to a predetermined boiling point.

6. An electrolyte for dry electrolytic condensers formed from a mixture including approximately 28 parts by weight of boric acid, 15 parts of ethylene glycol, 5 parts of manitol and 3¼ parts of ammonia, said electrolyte being the product resulting from cooking said mixture to a boiling point of approximately 257 degrees F.

7. An electrolyte for dry electrolytic condensers characterized by such liquidity at about 200 degrees F. as to permit impregnation of the interspacers by passing the same through the electrolyte in the course of winding the condensers, and characterized by substantial viscosity or solidity at temperatures below 160 degrees F., thereby precluding mechanical leakage of the electrolyte under actual conditions of use; said electrolyte having in the order of 10 per cent by weight of manitol, the remaining ingredients including boric acid, ethylene glycol and ammonia.

8. The method of reducing the forming time and improving the power factor and leakage characteristics of dry electrolytic condensers of a given voltage characteristic having built therein electrolyte of the character made up of polyhydric alcohol of order lower than hexahydric, a weak acid and an alkali, which method consists in adding to a mix of such ingredients, a proportion of hexahydric alcohol and cooking the mix to a boiling point lower than that to which the electrolyte without the manitol ingredient would have to be cooked to attain a given voltage characteristic.

9. The method of reducing the forming time and improving the power factor and leakage characteristic of dry electrolytic condensers of a given voltage characteristic having built therein electrolyte of the character made up of polyhydric alcohol of order lower than hexahydric, a weak acid and an alkali, which method consists in adding to a mix of such ingredients, a proportion of manitol in the order of about 10 per cent by weight of the mix, and cooking the mix to a boiling point lower than that to which the electrolyte without the manitol ingredient would have to be cooked to attain a given voltage characteristic.

HERBERT WATERMAN.